United States Patent [19]

Lewellyn

[11] Patent Number: 5,539,046
[45] Date of Patent: Jul. 23, 1996

[54] BLENDS OF HYDROXAMATED POLYMER EMULSIONS WITH POLYACRYLATE EMULSIONS

[75] Inventor: Morris E. Lewellyn, Stratford, Conn.

[73] Assignee: Cytec Technology Corp., Wilmington, Del.

[21] Appl. No.: 334,300

[22] Filed: Nov. 4, 1994

[51] Int. Cl.[6] .................. C08L 33/00; B01D 21/01; C02F 1/52
[52] U.S. Cl. .................. 524/801; 524/812; 524/816; 210/733; 210/734
[58] Field of Search .................. 524/801, 812, 524/816

[56] References Cited

U.S. PATENT DOCUMENTS

| | | | |
|---|---|---|---|
| 3,345,344 | 10/1967 | Fetscher et al. | 260/78.4 |
| 3,390,959 | 7/1968 | Sibert | 23/143 |
| 3,445,187 | 5/1969 | Sibert | 23/143 |
| 3,578,586 | 5/1971 | Gal et al. | 210/49 |
| 3,716,617 | 2/1973 | Oku et al. | 423/121 |
| 4,169,824 | 10/1979 | Kane | 260/29.6 M |
| 4,478,795 | 10/1984 | Hereda et al. | 423/127 |
| 4,480,067 | 10/1984 | Vio et al. | 524/446 |
| 4,532,046 | 7/1985 | Meunier et al. | 210/698 |
| 4,536,296 | 8/1985 | Vio | 252/8.5 C |
| 4,587,306 | 5/1986 | Vio et al. | 525/354 |
| 4,608,237 | 8/1986 | Roe et al. | 423/122 |
| 4,767,540 | 8/1988 | Spitzer et al. | 210/728 |
| 4,943,378 | 7/1990 | Flesher et al. | 210/734 |
| 5,093,091 | 3/1992 | Dauplaise et al. | 423/112 |
| 5,120,513 | 6/1992 | Moody et al. | 423/111 |
| 5,286,391 | 2/1994 | Malito et al. | 210/733 |
| 5,286,806 | 2/1994 | Neff et al. | 525/369 |

FOREIGN PATENT DOCUMENTS 0514648  11/1992  European Pat. Off. .

*Primary Examiner*—Tae H. Yoon
*Attorney, Agent, or Firm*—Claire M. Schultz; Bernard Lau

[57] ABSTRACT

A composition comprising a blend of an inverse emulsion of a hydroxamated polymer and a second inverse emulsion of a second polymer selected from the group consisting of alkali metal (meth)acrylate homopolymers, ammonium (meth)acrylate homopolymers, and copolymers of the (meth)acrylates with (alk)acrylamides, wherein the molar ratio of hydroxamated polymer to said second polymer in the emulsion is within the range of about 99:1 to 15:85 when the second polymer is an alkali metal (meth)acrylate homopolymer or copolymer and is within the range of about 99:1 to 58:42 when said second polymer is an ammonium (meth)acrylate homopolymer or copolymer. Processes for removing suspended solids from Bayer alumina process streams using these compositions are also provided.

33 Claims, No Drawings

BLENDS OF HYDROXAMATED POLYMER EMULSIONS WITH POLYACRYLATE EMULSIONS

FIELD OF THE INVENTION

This invention relates to the removal of suspended solids from Bayer alumina process streams by contacting the streams with blends of polymeric flocculants. The invention also relates to blends of hydroxamated polymer emulsions with polyacrylate emulsions.

BACKGROUND OF THE INVENTION

Bauxite is the basic raw material for almost all manufactured aluminum compounds. In the course of production of aluminum compounds, most bauxite is refined to aluminum hydroxide by the Bayer process. The Bayer process involves hot leaching of bauxite with NaOH solution in pressure vessels to obtain supersaturated sodium aluminate solutions from which $Al(OH)_3$ is precipitated by seeding. Bayer process refineries share six common process stages: bauxite mining; raw material preparation; bauxite digestion; separation, washing, disposal of insoluble bauxite residue; aluminum hydroxide (trihydrate) precipitation; and calcination to anhydrous alumina. The process of separating bauxite residue solids from the supersaturated green liquor near its boiling point is known as "clarification".

In the clarification stage, the coarser solid particles are generally removed with a "sand trap" cyclone. To separate the finer solid particles from the liquor, the slurry is normally fed to the center well of a mud settler where it is treated with a flocculant composition that may be based on a variety of flocculating agents including starch, flour, polyacrylate salt polymer, acrylate salt/acrylamide copolymer, and/or water-soluble polymers containing pendant hydroxamic acid or salt groups. As the mud settles, clarified sodium aluminate solution, referred to as green liquor, overflows a weir at the top of the mud settling tank and is passed to the subsequent process steps. The sodium aluminate solution is generally cooled to enhance supersaturation and then seeded, e.g., with fine gibbsite seed from previous cycles to initiate precipitation of the desired endproduct $Al(OH)_3$.

The settled solids from the flocculation procedure, known as red mud, are withdrawn from the bottom of the mud settler and passed through a countercurrent washing circuit for recovery of sodium aluminate and soda. Aluminate liquor overflowing the settler may still contain significant amounts of suspended solids. This liquor is generally further clarified by filtration to give a filtrate that contains a very low level of suspended solids.

Alumina in relatively pure form is precipitated from the filtrate as alumina trihydrate crystals. The remaining liquid phase is returned to the initial digestion step and, after being reconstituted with additional caustic, is employed as a digestant of additional ore.

The suspended solids should be separated at a relatively fast rate if the overall Bayer process is to be efficient. Efficient removal of suspended solids from Bayer process streams has been a major challenge for many years. Among the methods of speeding up separation of suspended solids from process streams as well as effecting a cleaner separation of the constituents are those disclosed in U.S. Pat. No. 3,390,959, which employs polyacrylates as flocculants, and U.S. Pat. No. 3,681,012, which uses combinations of polyacrylates and starch in Bayer alumina recovery circuits. U.S. Pat. No. 4,083,925 discloses the use of polyacrylamide within the mud settler. U.S. Pat. No. 4,678,585 teaches that different stages in the Bayer alumina recovery circuit are advantageously treated with different flocculant compositions. U.S. Pat. No. 4,767,540 describes a process for removing suspended solids from Bayer alumina process streams by contacting and mixing a Bayer process stream with hydroxamated polymers. The hydroxamated polymers may be employed with anionic polyacrylate.

The prevailing practice where two or more different types of flocculant emulsions are to be used to clarify Bayer process streams has been to individually invert emulsions containing each of the polymer types in water prior to separately feeding them into the alumina plant process stream. This necessitates two or more polymer makeup/dissolution systems, with concomitant increased equipment, material, energy, labor, and other costs.

Thus, there is a need for improved methods for adding such flocculants to process streams. This invention provides various solutions to this problem.

SUMMARY OF THE INVENTION

The present invention provides an inverse emulsion comprising in its discontinuous aqueous phase a hydroxamated polymer and a second polymer selected from the group consisting of alkali metal (meth)acrylate homopolymers, ammonium (meth)acrylate homopolymers, and copolymers of said acrylates with (alk)acrylamides. The molar ratio of hydroxamated polymer to the second polymer mer units is within the range of about 99:1 to about 15:85, preferably about 85:15 to about 20:80, when said second polymer is an alkali metal (meth)acrylate homopolymer or copolymer. The molar ratio of hydroxamated polymer to the second polymer mer units is within the range of about 99:1 to 58:42, preferably about 85:15 to 65:35, when said second polymer is an ammonium (meth)acrylate homopolymer or copolymer.

The present invention also provides a process for removing suspended solids from a process stream of the Bayer alumina process. This process comprises inverting an inverse emulsion comprising a blend of an inverse emulsion of hydroxamated polymer and a second inverse emulsion of a second polymer as described above to form a solution of the hydroxamated polymer and second polymer selected from the group consisting of an alkali metal (meth)acrylate homopolymer, an ammonium (meth)acrylate homopolymer, and copolymers of said acrylates with (alk)acrylamide; and contacting the solution with a Bayer process stream, wherein the solution contains an amount of said polymers effective to flocculate and settle the suspended solids therein. The Bayer process stream that may advantageously be contacted with the solution in accordance with the present invention may be settler feed, settler overflow, blow-off discharge, or from the alumina precipitation (i.e., recovery) circuit. The Bayer process stream contacted with the solution may also be feed to a mud washer in the washer train. The amount of solution employed to flocculate and settle the suspended solids in the Bayer process stream is preferably that sufficient to provide from 0.1 to 10 milligrams per liter of polymer solids to said stream. The emulsion may, where desired, further comprise a starch, flour, dextran, or additional synthetic polymer flocculant in an amount sufficient to assist in the flocculation of the suspended solids. The process in accordance with the invention preferably further comprises removing flocculated and settled suspended solids from the process stream.

The emulsion blend according to the present invention is preferably formed by providing a first inverse emulsion of a hydroxamated polymer, providing a second inverse emulsion of a second polymer selected from the group consisting of an alkali metal (meth)acrylate homopolymer, an ammonium (meth)acrylate homopolymer, and copolymers of said (meth)acrylates with (alk)acrylamide, and blending the first and second emulsions together. Each of the first and second emulsions may comprise from about 1–600%, preferably from about 100–500%, by weight water based upon the weight of the polymer therein. The emulsions disclosed herein are inverse, which means that aqueous droplets are suspended in a continuous oil phase. In one embodiment of the present invention, recycled Bayer process stream water may be employed to break the emulsion. In breaking the emulsion, generally a sufficient amount of the water is employed to provide a solution that contains less than about 1% polymer solids.

DETAILED DESCRIPTION OF THE INVENTION

The present invention provides a process for reducing the suspended solids level in process streams, generally aluminate liquors, of the Bayer alumina manufacturing process whereby a first polymer containing hydroxamic acid groups or salts thereof and a second polymer selected from the group consisting of an alkali metal (meth)acrylate homopolymer, an ammonium (meth)acrylate homopolymer, and copolymers of said (meth)acrylates with (alk)acrylamide are added together to the Bayer process stream in order to effectively remove suspended solids therefrom. However, as has been surprisingly discovered, effective flocculation performance can be attained only when certain ratios of the first and second polymer are used. As demonstrated in the Examples which follow, the present invention is based upon the discovery that the full performance achievable by way of two individual hydroxamated polymer and acrylate polymer emulsions is also achievable by way of a single blended emulsion approach, with a great savings in equipment, material, energy, labor, and other costs, when the two polymers are blended in accordance with the critical ratios described herein.

The new approach to removing suspended solids in the Bayer alumina process that is provided by the present invention involves forming an inverse emulsion of a hydroxamated polymer and of a second polymer selected from the group consisting of an alkali metal (meth)acrylate homopolymer, an ammonium (meth)acrylate homopolymer, and copolymers of said (meth)acrylates with (alk)acrylamide. Although these two flocculants can be incorporated together into the dispersed (aqueous) phase of an emulsion, it is preferred to provide a first inverse emulsion comprising a hydroxamated polymer in its dispersed phase, provide a second inverse emulsion of a second polymer in its dispersed phase selected from the group consisting of an alkali metal (meth)acrylate homopolymer, an ammonium (meth)acrylate homopolymer, and copolymers of said (meth)acrylates with (alk)acrylamide, and blend these two emulsions together. Those skilled in the art will recognize, of course, that this approach can potentially be used equally well with three, four, or even more flocculant types, such as, for example, starch, dextran, and the like.

It has been found that with an inverse emulsion of a hydroxamated polymer and a second inverse emulsion of a polymer selected from the group consisting of an alkali metal (meth)acrylate homopolymer, an ammonium (meth)acrylate homopolymer, and copolymers of said (meth)acrylates with (alk)acrylamide, the molar ratio of hydroxamated polymer to (meth)acrylate polymer in the blended emulsion should be controlled to certain ranges, depending upon the types of (meth)acrylate polymers used. When the (meth)acrylate polymer is an alkali metal (meth)acrylate homopolymer or copolymer, the molar ratio should be within the range of about 99:1 to about 15:85 mer units. When the (meth)acrylate polymer is an ammonium (meth)acrylate homopolymer or copolymer, the molar ratio should be within the range of about 99:1 to about 58:42 mer units. The emulsions of the instant invention may be used with other flocculant systems and, as such, the molar ratios may be adjusted as determined by one skilled in the art using routine experimentation.

Once the emulsion blend is formed as described, it may be broken, preferably by adding water thereto, to form the aqueous solution of a hydroxamated polymer and of a polymer selected from the group consisting of an alkali metal (meth)acrylate homopolymer and an ammonium (meth)acrylate homopolymer and copolymer of said acrylates with (alk)acrylamide. This solution is then ready for use to flocculate and settle the suspended solids in a Bayer process stream, subsequently permitting removal of the flocculated and settled suspended solids from the process stream.

The hydroxamated polymer

The polymer which contains hydroxamic acid groups or salts thereof can vary rather broadly in type. It should be sufficiently stable to be effective under the process conditions used, which include high temperatures, e.g., 185°–225° F., and strong caustic conditions, e.g., 80–400 grams/liter total alkali content expressed as sodium carbonate equivalent. Thus any water-soluble hydroxamic acid or salt group-containing polymer may be used in the process of the present invention. The useful polymers can best be exemplified by those containing pendant groups of the formula —C(O)N-HOR wherein R is hydrogen or a cation. These polymers are generally known in the art. They can be derived from polymers containing pendant ester, amide, anhydride, nitrile, and other such functional groups by the reaction thereof with hydroxylamine or its salt.

Illustrative of the polymers which may be hydroxamated for use in the process of the present invention are acrylic, methacrylic, and crotonic acid ester polymers such as polymers produced by the polymerization of methyl acrylate, ethyl acrylate, tertiary-butyl acrylate, methyl methacrylate, ethyl methacrylate, cyclohexyl methacrylate, dimethylaminoethyl methacrylate, and methyl crotonate, polymers of maleic anhydride and esters thereof, nitrile polymers such as those produced from acrylonitrile, and amide polymers such as those produced from acrylamide and methacrylamide.

Any water-soluble polymer may be used in the present process which performs to settle suspended solids after hydroxamation. Thus, homopolymers, copolymers, terpolymers, etc. of the above-enumerated monomers may be used. Suitable comonomers which, by copolymerization, may form up to about 95 mole percent of the polymers useful herein can include acrylic acid, sodium acrylate, 2-acrylamidopropanesulfonic acid, methacrylic acid, maleic anhydride, vinyl acetate, vinyl pyrrolidone, butadiene, and styrene as well as others of the above-mentioned esters, amides, and/or nitriles and the like as is known in the art, so long as such copolymers, terpolymers, etc. are water-soluble after hydroxamation.

Hydroxamated polymers are well known to those skilled in the art. Generally, they may be produced by reacting the polymer containing the pendant reactive group in solution with a hydroxylamine or its salt at a temperature ranging from about 20°–100° C. for several hours over a wide pH range, preferably at pH's over 7. Suitable hydroxylamine salts include the sulfates, sulfites, phosphates, perchlorates, hydrochlorides, acetates, propionates, and the like. From about 1–90% of the available pendant reactive groups of the polymer may be replaced by hydroxamic groups in accordance with this procedure. In addition to reaction of hydroxylamine or its salt with a polymer, it has been found that a polymer latex may be reacted directly with hydroxylamine or its salt. The latex may be, for instance, a copolymer of acrylamide and methyl acrylate or a copolymer of acrylic acid and methyl acrylate. In these cases the hydroxylamine or its salt reacts primarily with the ester groups to form hydroxamic acid groups. Further details on the preparation of hydroxamated polymers is found in U.S. Pat. Nos. 4,767,540 (Spitzer et al.), 4,902,751 (Lewellyn et al.), 5,128,420; 4,587,306, and 4,868,248, the disclosures of which are expressly incorporated herein by reference.

It is also possible to react inverse emulsions made of, for instance, aqueous polyacrylamide or acrylamide/acrylic acid copolymers dispersed in oil directly with hydroxylamine or its salt to give very high molecular weight polymers containing hydroxamic acid groups, all of which function efficiently in the process of the present invention. The preparation of emulsions comprising hydroxamated polymers in their discontinuous phase is well known to those skilled in the art, and is disclosed, for example, in European patent application Publication No. 0 514 648 A1, the entire disclosure of which is expressly incorporated by reference herein. Briefly, that publication describes the preparation of stable, water-in-oil microdispersions of hydroxamated polymers by a procedure that comprises reacting a water-in-oil microdispersion comprising a continuous phase of a suitable oil and an emulsifier and a discontinuous phase of an aqueous solution of a precursor polymer with neutralized hydroxylamine and excess base.

The degree of hydroxamation, that is, the concentration of groups of the formula —C(O)NHOR wherein R is hydrogen or a cation, in the polymers useful herein may range from about 1 to about 90 mole percent and will preferably be from about 10 to about 65 mole percent. The molecular weight of the hydroxamated polymers that are useful in the process of the present invention ranges from about $1 \times 10^4$ to about $6 \times 10^7$.

The (meth)acrylate polymers

At least a second polymeric flocculant is employed in accordance with the present invention. This second polymer is advantageously a (meth)acrylate polymer selected from the group consisting of alkali metal (meth)acrylate homopolymers, ammonium (meth)acrylate homopolymers, and copolymers of said (meth)acrylates with (alk)acrylamides. Typical alkali metal acrylate polymers include those of potassium, rubidium, and cesium. The preferred alkali metal (meth)acrylates are sodium acrylate homopolymers and copolymers thereof with acrylamide. Those skilled in the art are well acquainted with polyacrylate flocculants which may be used to treat Bayer process waters. Patents that describe methods of their preparation include U.S. Pat. Nos. 3,390,959, 3,445,187, 3,716,617, 3,755,531, and 4,678,585. Each of these patents is expressly incorporated herein by reference. As is known to those skilled in the art, Bayer process polyacrylate flocculants will often be copolymers containing additional functional groups such as amide groups, preferably copolymers containing (alk)acrylamides, more preferably acrylamide. Copolymers may additionally contain acrylic acid, 2-acrylamidopropanesulfonic acid, and the like.

Thus, in accordance with the present invention, the second polymer is a (meth)acrylate homopolymer or a copolymer of acrylate/acrylic acid with an (alk)acrylamide in which the molar ratio of acrylate/acrylic acid to acrylamide moieties is greater than 50%. The molecular weight of the second polymer is not critical, and generally ranges from about 1 to 100 million, preferably from about 5 to 50 million.

Homopolymers of acrylate/acrylic acid and copolymers of acrylate/acrylic acid with small amounts of acrylamide are generally used in primary settling streams. Typically, 95–100% of the functional groups in a conventional primary flocculant will be carboxyl groups (from acrylate and acrylic acid monomers), with the remaining 5–0% being carboxamide groups (from the acrylamide monomers). In a conventional washer train flocculant, on the other hand, typically 50–90% of the functional groups will be carboxyl groups with the remaining 50–10% being carboxamide groups, resulting in a less highly anionic copolymer.

Molar ratios

In accordance with the present invention, when the emulsion blend comprises an alkali metal (meth)acrylate homopolymer or copolymer, the molar ratio of hydroxamate polymer to said (meth)acrylate polymer mer units may range from about 99:1 to about 15:85. Thus, when the second polymer is an alkali metal (meth)acrylate polymer, the emulsion blend usually contains at least about 15 moles of hydroxamated polymer to about 85 moles of alkali metal (meth)acrylate polymer, preferably at least about 20 moles of hydroxamated polymer to about 80 moles of alkali metal (meth)acrylate polymer, and most preferably at least about 23 moles of hydroxamated polymer to about 77 moles of alkali metal (meth)acrylate polymer. Also, when the second polymer is an alkali metal (meth)acrylate, the emulsion usually contains up to about 99 moles of hydroxamate polymer to about 1 mole of alkali metal (meth)acrylate polymer, generally up to about 90 moles of hydroxamated polymer to about 10 moles of alkali metal (meth)acrylate polymer, preferably up to about 85 moles of hydroxamate polymer to about 15 moles of (meth)acrylate polymer. When the emulsion blend comprises an ammonium (meth)acrylate homopolymer or copolymer, however, the molar ratio of hydroxamate polymer to said (meth)acrylate polymer mer units may range from about 99:1 to about 58:42. Thus, when the second polymer is an ammonium (meth)acrylate polymer, the emulsion blend usually contains at least about 58 moles of hydroxamated polymer to about 42 moles of ammonium (meth)acrylate polymer, preferably at least about 60 moles of hydroxamated polymer to about 40 moles of ammonium (meth)acrylate polymer, more preferably at least about 65 moles of hydroxamated polymer to about 35 moles of ammonium (meth)acrylate polymer, and most preferably at least 70 moles of hydroxamated polymer to 30 moles of ammonium (meth)acrylate polymer. When the second polymer is ammonium (meth)acrylate, the molar ratio of hydroxamated polymer to (meth)acrylate polymer may usually range up to about 99 moles of hydroxamated polymer to about 1 mole of (meth)acrylate polymer, generally up to about 85 moles hydroxamated polymer to about 15 moles (meth)acrylate polymer, preferably up to about moles of hydroxamate polymer to about 20 moles of (meth)acrylate polymer. Tables A and A' illustrates various hydroxamated polymer/acrylate polymer molar ratio ranges that characterize the present invention.

TABLE A

| Polyacrylate polymer cation | Polymer molar ratio range hydroxamated polymer:polyacrylate polymer mer units |
|---|---|
| Alkali metal | about 99:1 to about 15:85 (usual) |
| Alkali metal | about 90:10 to about 15:85 (generally) |
| Alkali metal | about 85:15 to about 20:80 (preferred) |
| Alkali metal | about 85:15 to about 23:77 (most preferred) |

TABLE A'

| Polyacrylate polymer cation | Polymer molar ratio range hydroxamated polymer:polyacrylate polymer mer units |
|---|---|
| Ammonium | about 99:1 to about 58:42 (usually) |
| Ammonium | about 85:15 to about 58:42 (generally) |
| Ammonium | about 80:20 to about 60:40 (preferred) |
| Ammonium | about 80:20 to about 65:35 (more preferred) |
| Ammonium | about 80:20 to about 70:30 (most preferred) |

Tables B and C illustrate various specific molar ratio blends of hydroxamated polymers with polyacrylate polymers.

TABLE B

| Polyacrylate salt | Weight ratio of emulsions | Molar ratio | Emulsion blend or solution | Settling (ft/hr) | Solution viscosity (cps) | Example Ref. |
|---|---|---|---|---|---|---|
| sodium | 90:10 | 83:17 | blend | | 9.9 | 13 |
| sodium | 90:10 | 83:17 | solution | | 9.0 | 14 |
| sodium | 80:20 | 61:39 | blend | | 8.8 | 15 |
| sodium | 80:20 | 61:39 | solution | | 8.3 | 16 |
| sodium | 70:30 | 56:44 | blend | 20 | 8.4 | 5, 17 |
| sodium | 70:30 | 56:44 | solution | 18 | 8.5 | 6, 18 |
| sodium | 50:50 | 35:65 | blend | | 7.2 | 19 |
| sodium | 50:50 | 35:65 | solution | | 7.1 | 20 |
| sodium | 40:60 | 27:73 | blend | 27 | | 1 |
| sodium | 40:60 | 27:73 | solution | 22 | | 2 |
| sodium | 30:70 | 19:81 | blend | | 6.3 | 21 |
| sodium | 30:70 | 19:81 | solution | | 6.5 | 22 |
| sodium | 25:75 | 15:85 | blend | 17 | | 3 |
| sodium | 25:75 | 15:85 | solution | 25 | | 4 |
| *sodium | 10:90 | 6:94 | blend | | 5.1 | 23 |
| *sodium | 10:90 | 6:94 | solution | | 6.4 | 24 |

*molar ratio not within range of present invention

TABLE C

| Polyacrylate salt | Weight ratio of emulsions | Molar ratio | Emulsion blend or solution | Settling (ft/hr) | Solution viscosity (cps) | Example Ref. |
|---|---|---|---|---|---|---|
| ammonium | 90:10 | 77:23 | blend | 16 | 8.7 | 7, 25 |
| ammonium | 90:10 | 77:23 | solution | 14 | 8.9 | 8, 26 |
| ammonium | 80:20 | 60:40 | blend | 7 | 7.8 | 9, 27 |
| ammonium | 80:20 | 60:40 | solution | 7 | 7.9 | 10, 28 |
| *ammonium | 70:30 | 47:53 | blend | 5.5 | 6.8 | 11, 29 |
| *ammonium | 70:30 | 47:53 | solution | 15 | 7.3 | 12, 30 |
| *ammonium | 50:50 | 27:73 | blend | | 5.2 | 31 |
| *ammonium | 50:50 | 27:73 | solution | | 6.6 | 32 |

*molar ratio not within range of present invention

As discussed in more detail in connection with the Examples hereinbelow, these settling rates and viscosities are indicative of the efficacy of the polymers as flocculants. The data in Tables B and C indicates that operation within the critical molar ratio ranges of the present invention provides improved flocculation as compared to operation outside of the molar ratio ranges of the present invention.

Emulsions and Solutions

Suitable emulsifiers or surfactants useful in the preparation of water-in-oil emulsions in accordance with the present invention include the ethoxylated fatty amines, the alkanolamides of fatty acids, imidazole-fatty acid reaction products, alkanolamine-fatty acid condensation products, sorbitan fatty esters, and the like. U.S. Pat. No. 4,339,371 (Robinson et al.) is expressly incorporated herein by reference for its teachings concerning emulsion surfactants. Certain surfactants aid in inversion in addition to forming the emulsion. As is well known to those skilled in the art, the size of polymer particles in the emulsion can be affected by the choice of emulsifier. In accordance with the present invention, the size of the dispersed phase of the emulsion, also called particle size, is not critical. For convenience, however, it is preferable to provide polymer particles ranging in size from about 0.02 to about 200 microns, with the polymer particle size range of 0.1 to 50 being especially preferred. Macroemulsions as well as microemulsions are included within the scope of this invention. The preparation of microemulsions is known in the art and disclosed in, for example, U.S. Pat. Nos. 4,956,399 (Kozakiewicz et al.), 4,521,317 (Candau et al.), and 4,681,912 (Durand et al.), each of which is expressly incorporated herein by reference.

Likewise, U.S. Pat. Nos. 3,284,393 (Vanderhoff et al.) and 3,624,019 (Anderson et al.) are each expressly incorporated herein by reference for their teachings of how to make emulsions including polyacrylate emulsions. Any known oil may be used in forming emulsions in accordance with the present invention, including isoparaffinic, normal, or cyclic hydrocarbons such as benzene, xylene, toluene, fuel oil, kerosene, odorless mineral spirits, and mixtures thereof. The ratio of aqueous phase to hydrocarbon phase may vary widely. Ratios in the range of about 0.5:1 to about 3:1 are preferred, with ratios of about 2:1 being especially convenient.

The flocculant polymers of the present invention are emulsified for handling in very roughly one to three times their weight of water. Since the purpose of the water is simply to provide the flocculant polymer in a form that is convenient for handling, normally no more water is used than is necessary to provide an emulsion which will retain its stability over the time, temperature, settling, and other storage and handling parameters to which the emulsion will be subjected before use.

As indicated above, conventional practice is to break each flocculant polymer emulsion separately and then feed the resultant solution into the medium being treated or, if desired, blend the resultant solutions. According to the present invention, a hydroxamated polymer emulsion may be blended with an acrylate polymer emulsion and then the emulsion blend inverted prior to use. However, it has been surprisingly discovered that these two types of polymers or polymer emulsions, when blended in just any molar ratio, may not provide sufficient flocculation performance. Unexpectedly, it has been discovered that it is only when the hydroxamated polymer emulsions and acrylate polymer emulsions contain or are blended in accordance with the critical molar ratios disclosed herein that the resulting emulsion containing the two polymers will perform as well as the combined use of two separate hydroxamated polymer and acrylate polymer solutions (made from separate emulsions).

Polymer emulsions can be stored in tanks constructed with high density polyethylene, polyvinyl chloride, fiberglass reinforced polyester, or 316 stainless steel. In order to permit efficient operation in a Bayer process plant context, the storage tank will ideally be large enough to hold two tank truck loads. Many polymer-containing emulsions have a tendency to settle with time and therefore require some sort of agitation to maintain a homogeneous product. This agitation is best done with a mixer for one-half to one hour per day. Excessive recirculation or agitation of the emulsion in storage should be avoided.

The hydroxamated polymer and acrylate polymer emulsions are conventional and comprise small aqueous polymer droplets dispersed in oil and, preferably, surfactant or surfactant mixture. While surfactants are known in the art, examples of preferred surfactants include sorbitan monooleate and ethoxylated fatty amine. Preferably the surfactant is chosen to both stabilize the dispersion and make the dispersion self-inverting. The terminology "self-inverting" in this context means that when the emulsion is added to water, the oil is readily dispersed or emulsified, allowing the polymer droplets to quickly dissolve in the water. This inversion of the inverse emulsion to produce a polymer solution, which operation may also be referred to as "breaking" the emulsion, is conducted using methods known in the art preferably with equipment that will provide a short high-energy mix followed by a short period of aging with or without gentle mixing.

In accordance with the present invention, the emulsion blend is broken by adding water to it. Preferably, and in practice, the water will generally have its origin in Bayer process settling or washing streams. As such, it will normally be somewhat alkaline. If desired, for instance, the alkalinity can be adjusted to a level which is approximately that corresponding to 2% sodium hydroxide. Moreover, as discussed below, the level of polymer that is used to flocculate the Bayer process streams is extremely low. Accordingly, for example, the emulsion blend described above will be broken by adding it to sufficient water containing 2% sodium hydroxide to provide a solution containing generally less than 1%, preferably from about 0.05 to 1%, and more preferably about 0.1% polymer solids. As indicated above, the addition of high shear or energy of short duration completes the inversion of the emulsion.

Flocculation

The total amount of the first, hydroxamated polymer and second, polyacrylate polymer preferably added to flocculate the suspensions ranges from 0.01 to 40 pounds of flocculant per ton of dry mud or charge solids residue. While the polymers of the present invention may be added at any stage of the Bayer process, in the context of commercial plant operation, addition of the polymers of the present invention is preferably to the settler feed as is practiced with conventional anionic flocculants. Alternatively, however, the polymer combinations of the present invention may also be added to the overflow from a primary settler or to the blow-off from the digesters. The polymer combinations may also be used in the settling of muds in the mud washing circuit.

The polymer blends used in the present invention are employed by adding them in the form of a dilute aqueous solution to the digested bauxite ore process stream containing solubilized alumina and suspended solids dispersed throughout, in an amount at least sufficient to settle said suspended solids. Generally, for best results, at least about 0.1 milligrams up to about 30 milligrams of total polymer per liter of the process stream should be employed. More preferably, at least 1 milligram per liter of the polymer blend is added. Higher amounts may of course be employed without departing from the scope of the invention, although generally a point is reached at which additional amounts of flocculant do not improve the separation rate over already achieved maximum rates. Those skilled in the art will recognize that it is generally uneconomical to use amounts of flocculant polymer blend beyond that necessary to achieve maximum separation rates in a given system.

Because of the very large volumes of aqueous medium that are necessary to achieve the very low concentrations of polymer solids that are used in accordance with the present invention, as mentioned above, it is often convenient to use two dilution steps. The primary dilution breaks the emulsion to form a solution containing from about 1 to 4% flocculant polymer solids. The secondary dilution then lowers the flocculant polymer solids level to its working concentration of about 0.03 to 0.5%. The secondary dilution is best accomplished as an integral part of the polymer delivery system.

In a simple polymer delivery system in accordance with the present invention, the polymer solution is made up to contain from about 0.1 to 4% flocculant polymer solids. It will generally contain less than about 1% polymer solids. This solution is then pumped using a positive displacement pump to a header for distribution. The secondary dilution is carried out between the pump and the header. Distribution of the diluted polymer to the individual feed points is accomplished with valves.

The more different points at which the flocculant polymer solution in accordance with the present invention is added to the slurry to be clarified, the more effective it will be. Therefore, for maximum efficiency, it will be added in at least two and preferably in more different locations of the Bayer process stream for which settling is desired.

EXAMPLES

The following non-limiting examples illustrate various aspects of the present invention.

Examples 1–4

PARTICLE SETTLING

Emulsion A—a hydroxamated polyacrylamide emulsion—was prepared as follows: 117 Parts by weight of a caustic aqueous hydroxylamine solution containing 2 weight % hydroxylamine was added over thirty minutes with stirring at room temperature to 177 parts by weight of a polyacrylamide inverse emulsion containing an ethoxylated amine surfactant. After all of the hydroxylamine was added, 6 parts by weight of a suitable ethoxylated breaker surfactant was added. The resulting hydroxamated polyacrylamide inverse emulsion contained 15.2 weight % polymer solids with 14 mole hydroxamate groups.

Emulsion B—a sodium polyacrylate emulsion—was prepared as follows: 58.1 Parts by weight of a 29 weight % aqueous acrylic acid solution neutralized with sodium hydroxide was emulsified with 22 parts by weight of a light hydrocarbon oil mixture containing a sorbitan monooleate surfactant. After deoxygenation with nitrogen gas, the polymerization was initiated with a redox catalyst system to yield a sodium acrylate inverse emulsion containing 20.5 weight % polymer solids.

Emulsion C was prepared by vigorously mixing 40 parts by weight of Emulsion A with 60 parts by weight of Emulsion B. Emulsion C has a molar ratio of hydroxamated polymer to sodium acrylate homopolymer mer units of 27:73. Emulsion C was then broken by adding it to sufficient water containing 2% sodium hydroxide to provide a solution containing 0.1% polymer solids. This solution (Example 1) was used for settling tests on a red mud slurry at a dosage rate of 48 grams of polymer per ton of red mud solids. The dosage of flocculant to be tested was added to a 1000 milliliter graduated cylinder filled with an aqueous sample containing red mud particles to be settled. The flocculant was then mixed into the Bayer process stream water by five strokes of a perforated plunger. The descent of the liquid/solid interface is timed in feet per hour to determine the effectiveness of the flocculant.

For comparison, a solution ("Example 2*") containing 0.1% polymer solids was prepared by breaking Emulsion A by adding it to sufficient water containing 2% sodium hydroxide to provide a solution containing 0.1% polymer solids, breaking Emulsion B by adding it to sufficient water containing 2% sodium hydroxide to provide a solution containing 0.1% polymer solids, and mixing these two solutions to provide the solution of Example 2* having a molar ratio of hydroxamated polymer to acrylate homopolymer mer units of 27:73. The solution of Example 2* was also used for settling tests on a red mud slurry at a dosage rate of 48 grams of polymer per ton of red mud solids.

In a similar manner, emulsions were blended in accordance with the present invention, two solutions made from hydroxamated polymer emulsion and sodium acrylate homopolymer emulsion were mixed for comparison with the invention in weight ratios of 25:75 to provide solutions (Examples 3,4*) having a molar ratio of hydroxamated polymer to acrylate homopolymer mer units of 15:85. Both of the resulting solutions were likewise used for settling tests on a red mud slurry at a dosage rate of 50 grams of polymer per ton of red mud solids.

The results of the red mud settling tests for these two groups of solutions appear in Table 1:

TABLE 1

| Ex. | weight ratio of emulsions | molar ratio | blend/solution | ft/hr |
|---|---|---|---|---|
| 1 | 40:60 | 27:73 | blend | 27 |
| 2* | 40:60 | 27:73 | solution | 22 |
| 3 | 25:75 | 15:85 | blend | 17 |
| 4* | 25:75 | 15:85 | solution | 25 |

*comparative

As the reported results demonstrate, the use of emulsion blend technology in accordance with the present invention provides an enhanced settling rate, in addition to the materials handling advantages inherent in the novel emulsion blend approach.

Examples 5–6

PARTICLE SETTLING

Emulsions A and B were prepared as described above. Emulsion D was prepared by vigorously mixing 70 parts by weight of Emulsion A with 30 parts by weight of Emulsion B. Emulsion D has a molar ratio of hydroxamated polymer to sodium acrylate homopolymer mer units of 56:44. Emulsion D was then broken by adding it to sufficient water containing 2% sodium hydroxide to provide a solution of Example 5 containing 0.1% polymer solids. The solution of Example 5 was used for settling tests on a red mud slurry at a dosage rate of 62 grams of polymer per ton of red mud solids.

For comparison, a solution (Example 6*) containing 0.1% polymer solids was prepared by breaking Emulsion A by adding it to sufficient water containing 2% sodium hydroxide to provide a solution containing 0.1% polymer solids, breaking Emulsion B by adding it to sufficient water containing 2% sodium hydroxide to provide a solution containing 0.1% polymer solids, and mixing these two solutions to provide a solution (Example 6*) having a molar ratio of hydroxamated polymer to polyacrylate mer units of 56:44. The solution of Example 6* was also used for settling tests on a red mud slurry at a dosage rate of 62 grams of polymer per ton of red mud solids.

The results of the red mud settling tests for this group of solutions appear in Table 2:

TABLE 2

| Ex. | weight ratio of emulsions | molar ratio | blend/solution | ft/hr |
|---|---|---|---|---|
| 5 | 70:30 | 56:44 | blend | 20 |
| 6* | 70:30 | 56:44 | solution | 18 |

*comparative

As the reported results demonstrate, the use of emulsion blend technology in accordance with the present invention under these conditions provides a settling rate comparable to the use of the two polymer emulsions inverted separately, in addition to the materials handling advantages inherent in the novel emulsion blend approach.

Examples 7–12

PARTICLE SETTLING

Emulsion A was prepared as described above.

Emulsion E—an ammonium polyacrylate emulsion—was prepared as follows: 31.1 Parts by weight of a 44 weight % aqueous acrylic acid solution neutralized with ammonia was emulsified with 12.1 parts by weight of a light hydrocarbon oil mixture containing a sorbitan monooleate surfactant. After deoxygenation with nitrogen gas, the polymerization was initiated with a redox catalyst system to yield an ammonium acrylate inverse emulsion containing 30 weight % polymer solids.

Emulsion F was prepared by vigorously mixing 90 parts by weight of Emulsion A with 10 parts by weight of Emulsion E. Emulsion F has a molar ratio of hydroxamated polymer to ammonium acrylate homopolymer mer units of 77:23. Emulsion F was then broken by adding it to sufficient water containing 2% sodium hydroxide to provide a solution (Example 7) containing 0.1% polymer solids.

For comparison, a solution (Example 8*) containing 0.1% polymer solids was prepared by breaking Emulsion A by adding it to sufficient water containing 2% sodium hydroxide to provide a solution containing 0.1% polymer solids, breaking Emulsion E by adding it to sufficient water containing 2% sodium hydroxide to provide a solution containing 0.1% polymer solids, and mixing these two solutions to provide a solution (Example 8*) having a molar ratio of hydroxamated polymer to acrylate homopolymer mer units of 77:23.

In a similar manner, emulsions were blended in accordance with the present invention and solutions were mixed for comparison with the invention in weight ratios of 80:20 and 70:30 to provide solutions (Examples 9, 10*, 11, and 12*) having a molar ratio of hydroxamated polymer to polyacrylate mer units of 60:40 and 47:53, respectively. The emulsion blend having the molar ratio 47:53 exhibited flocculation performance inferior to that obtainable with chemically similar polymer solution blends having the same molar ratio.

The solution of Example 7 was used for settling tests on a red mud slurry at a dosage rate of 65 grams of polymer per ton of red mud solids. The solution of Example 8* was also used for settling tests on a red mud slurry at a dosage rate of 62 grams of polymer per ton of red mud solids. The solutions of Examples 9 and 10* were used for settling test on red mud slurries at a dosage of 62 grams of polymer per ton of red mud solids. The solutions of Examples 11 and 12* were used for settling test on red mud slurries at a dosage of 57 grams of polymer per ton of red mud solids. The results of the red mud settling tests for the solutions of Examples 7–12 are set forth in Table 3:

TABLE 3

| Ex. | weight ratio of emulsions | molar ratio | blend/solution | ft/hr |
|---|---|---|---|---|
| 7 | 90:10 | 77:23 | blend | 16 |
| 8* | 90:10 | 77:23 | solution | 14 |
| 9 | 80:20 | 60:40 | blend | 7 |
| 10* | 80:20 | 60:40 | solution | 7 |
| 11** | 70:30 | 47:53 | blend | 5.5 |
| 12* | 70:30 | 47:53 | solution | 15 |

*comparative
**outside scope of invention

As the reported results demonstrate, the use of emulsion blend technology in accordance with the present invention provides a settling rate comparable to the use of the two polymer emulsions inverted separately, in addition to the materials handling advantages inherent in the novel emulsion blend approach. This is particularly surprising because emulsion blend technology practiced outside of the flocculant molar ratio range found critical herein provides settling rates that are inferior to conventional solution technology.

Examples 13–24

VISCOSITY

Emulsions A and B were prepared as described above. Emulsion G was prepared by vigorously mixing 90 parts by weight of Emulsion A with 10 parts by weight of Emulsion B. Emulsion G has a molar ratio of hydroxamated polymer to sodium acrylate homopolymer mer units of 83:17. Emulsion G was then broken by adding it to sufficient water containing 2% sodium hydroxide to provide the solution of Example 13, containing 0.1% polymer solids. The solution viscosity of the solution of Example 13 was measured as a 0.1%, by weight, polymer solids solution in 1 molar sodium chloride on a Brookfield viscometer, with a U.L. adaptor, at 60 rpm or 30 rpm with adjustments using standard procedures known in the art.

For comparison, a solution (Example 14*) containing 0.1% polymer solids was prepared by breaking Emulsion A by adding it to sufficient water containing 2% sodium hydroxide to provide a solution containing 0.1% polymer solids, breaking Emulsion B by adding it to sufficient water containing 2% sodium hydroxide to provide a solution containing 0.1% polymer solids, and mixing these two solutions to provide the solution of Example 14* having a molar ratio of hydroxamated polymer to sodium acrylate homopolymer mer units of 83:17. The viscosity of the solution of Example 14* was also measured as described above.

In a similar manner, emulsions were blended in accordance with the blend procedure of the present invention and solutions were mixed for comparison with the invention to provide solutions having molar ratios of hydroxamated polymer to polyacrylate mer units of 61:39, 56:44, 35:65, 19:81, and 6:94, respectively. The emulsion blend having the molar ratio 6:94 showed inferior performance compared to the conventional use of chemically similar polymer solution blends having the same molar ratio. The viscosities of the resulting solutions were likewise measured as described above.

The viscosity readings for these two groups of solutions are set forth in Table 4:

TABLE 4

| Ex. | weight ratio of emulsions | molar ratio | blend/solution | viscosity cps |
|---|---|---|---|---|
| 13 | 90:10 | 83:17 | blend | 9.9 |
| 14* | 90:10 | 83:17 | solution | 9.0 |
| 15 | 80:20 | 61:39 | blend | 8.8 |
| 16* | 80:20 | 61:39 | solution | 8.3 |
| 17 | 70:30 | 56:44 | blend | 8.4 |
| 18* | 70:30 | 56:44 | solution | 8.5 |
| 19 | 50:50 | 35:65 | blend | 7.2 |
| 20* | 50:50 | 35:65 | solution | 7.1 |
| 21 | 30:70 | 19:81 | blend | 6.3 |
| 22* | 30:70 | 19:81 | solution | 6.5 |
| 23** | 10:90 | 06:94 | blend | 5.1 |
| 24* | 10:90 | 06:94 | solution | 6.4 |

*comparative
**outside scope of invention

As the reported results demonstrate, the use of emulsion blend technology in accordance with the present invention provides solution viscosities that are comparable to and in some cases superior to those provided by conventional solution blend technology. This is particularly surprising because emulsion blend technology practiced outside of the critical molar ratios disclosed herein provides viscosities that reflect inferior performance compared to conventional solution blend technology. It is known in the art that the solution viscosity level of a flocculant polymer solution is a predictor of its relative effectiveness in flocculation and settling efficiency.

Examples 25–32

VISCOSITY

Emulsions A and E were prepared as described above. Emulsion H was prepared by vigorously mixing 90 parts by weight of Emulsion A with 10 parts by weight of Emulsion E. Emulsion H has a molar ratio of hydroxamated polymer to ammonium acrylate homopolymer mer units of 77:23. Emulsion H was then broken by adding it to sufficient water containing 2% sodium hydroxide to provide a solution (Example 25) containing 0.1% polymer solids. The viscosity of the solution of Example 25 was determined by the procedure set forth above.

For comparison, a solution (Example 26*) containing 0.1% polymer solids was prepared by breaking Emulsion A by adding it to sufficient water containing 2% sodium hydroxide to provide a solution containing 0.1% polymer solids, breaking Emulsion E by adding it to sufficient water containing 2% sodium hydroxide to provide a solution containing 0.1% polymer solids, and mixing these two solutions to provide the solution of Example 26* having a molar ratio of hydroxamated polymer to ammonium polyacrylate mer units of 77:23. The viscosity of the solution of Example 26* was also determined by the procedure set forth above.

In a similar manner, emulsions were blended in accordance with the blend procedure of the present invention and solutions were mixed for comparison with the invention to provide solutions having molar ratios of hydroxamated polymer to polyacrylate mer units of 60:40, 47:53, and 27:73, respectively. The blend emulsions having the molar ratios 47:53 and 27:73 showed inferior performance compared to the conventional use of chemically similar polymer solution blends having the same molar ratio. The viscosities of the resulting solutions were likewise determined by the procedure set forth above.

The viscosity readings for these two groups of solutions is set forth in Table 5:

TABLE 5

| Ex. | weight ratio of emulsions | molar ratio | blend/solution | viscosity cps |
|---|---|---|---|---|
| 25 | 90:10 | 77:23 | blend | 8.7 |
| 26* | 90:10 | 77:23 | solution | 8.9 |
| 27 | 80:20 | 60:40 | blend | 7.8 |
| 28* | 80:20 | 60:40 | solution | 7.9 |
| 29** | 70:30 | 47:53 | blend | 6.8 |
| 30* | 70:30 | 47:53 | solution | 7.3 |
| 31** | 50:50 | 27:73 | blend | 5.2 |
| 32* | 50:50 | 27:73 | solution | 6.6 |

*comparative
**outside scope of invention

As the reported results demonstrate, the use of emulsion blend technology provides solution viscosities that are comparable to those provided by conventional polymer solution blend technology, but, surprisingly, only when the polymer emulsions contain hydroxamated polymer and acrylate polymer within the molar ratio ranges found in the present invention. Outside of these ranges, polymer viscosities are inferior to conventional polymer solution blend technology.

What is claimed is:

1. An inverse emulsion comprising in its dispersed phase a hydroxamated polymer and a second polymer selected from the group consisting of alkali metal (meth)acrylate homopolymers, ammonium (meth)acrylate homopolymers, and copolymers of said (meth)acrylates with (alk)acrylamide, wherein the molar ratio of hydroxamated polymer to said second polymer in the emulsion is within the range of about 99:1 to 15:85 when said second polymer is an alkali metal (meth)acrylate homopolymer or copolymer and is within the range of about 99:1 to 58:42 when said second polymer is an ammonium (meth)acrylate homopolymer or copolymer.

2. The inverse emulsion of claim 1 wherein the second polymer is an alkali metal (meth)acrylate homopolymer or ammonium (meth)acrylate homopolymer.

3. The inverse emulsion of claim 1 wherein the second polymer is a copolymer of said (meth)acrylates with acrylamide.

4. The inverse emulsion of claim 3 wherein the copolymer further contains (meth)acrylic acid and at least 50 mole percent of the copolymer contains (meth)acrylic acid or (meth)acrylate.

5. The inverse emulsion of claim 1 wherein the molecular weight of the second polymer is from about 1 to 100 million.

6. The inverse emulsion of claim 5 wherein the molecular weight of the second polymer is from about 5 to 50 million.

7. The inverse emulsion of claim 1 wherein the degree of hydroxamation of the hydroxamated polymer is from about 1 to 90%.

8. The inverse emulsion of claim 7 wherein the degree of hydroxamation of the hydroxamated polymer is from about 10 to 65%.

9. The inverse emulsion of claim 1 wherein the second polymer is a sodium (meth)acrylate homopolymer or a copolymer of said (meth)acrylate with (alk)acrylamide and the molar ratio of hydroxamated polymer to said second polymer is within the range of about 90:10 to 15:85.

10. The inverse emulsion of claim 1 wherein the second polymer is an ammonium (meth)acrylate homopolymer or a copolymer of said (meth)acrylate with (alk)acrylamide and the molar ratio of hydroxamated polymer to said second polymer is within the range of about 85:15 to 58:42.

11. The inverse emulsion of claim 1 wherein the hydroxamated polymer has a molecular weight ranging from about $1 \times 10^4$ to $6 \times 10^7$, is derived from a polymer containing pendant ester, amide, anhydride, or nitrile groups, and has a degree of hydroxamation of about 1 to 90 mole percent.

12. The inverse emulsion of claim 11 wherein said hydroxamated polymer is derived from a polymer containing amide or ester groups and the degree of hydroxamation of said polymer ranges from about 10 to about 65 mole percent.

13. The inverse emulsion of claim 12 wherein said hydroxamated polymer is derived from an acrylate/acrylamide copolymer.

14. The inverse emulsion of claim 1 wherein the hydroxamated polymer is a hydroxamated acrylic acid/acrylamide copolymer and the second polymer is a sodium acrylate homopolymer, wherein the molar ratio of hydroxamated copolymer to sodium acrylate homopolymer is in the range of about 90:10 to 15:85.

15. The inverse emulsion of claim 1 wherein the hydroxamated polymer has a molecular weight ranging from about $1 \times 10^4$ to $6 \times 10^7$.

16. The inverse emulsion of claim 1 wherein said emulsion is a microemulsion.

17. A composition comprising a blend of an inverse emulsion comprising in its discontinuous phase a hydroxamated polymer and a second inverse emulsion comprising in its discontinuous phase a second polymer selected from the group consisting of alkali metal (meth)acrylate homopolymers, ammonium (meth)acrylate homopolymers, and copolymers of said (meth)acrylates with (alk)acrylamides, wherein the molar ratio of hydroxamated polymer to said second polymer is within the range of about 99:1 to 15:85 when said second polymer is an alkali metal (meth)acrylate homopolymer or copolymer and is within the range of about 99:1 to 58:42 when said second polymer is an ammonium (meth)acrylate homopolymer or copolymer.

18. The composition of claim 17 wherein the weight ratio of the inverse emulsion of hydroxamated polymer to the inverse emulsion of the (meth)acrylate homopolymer or copolymer is within the range of about 99:1 to 25:75 when said second polymer is an alkali metal (meth)acrylate homopolymer or copolymer and is within the range of about 99:1 to 75:25 when said second polymer is an ammonium (meth)acrylate homopolymer or copolymer.

17

19. The composition of claim 17 wherein the second polymer is an alkali metal (meth)acrylate homopolymer or ammonium (meth)acrylate homopolymer.

20. The composition of claim 17 wherein the second polymer is a copolymer of alkali metal or ammonium (meth)acrylate with acrylamide.

21. The composition of claim 20 wherein the copolymer further contains (meth)acrylic acid and at least 50 mole percent of the copolymer contains (meth)acrylic acid or (meth)acrylate.

22. The composition of claim 17 wherein the molecular weight of the second polymer is from about 5 to 50 million.

23. The composition of claim 17 wherein the degree of hydroxamation of the hydroxamated polymer is from about 10 to 65%.

24. The composition of claim 17 wherein the second polymer is a sodium (meth)acrylate homopolymer or a copolymer of said (meth)acrylate with (alk)acrylamide and the molar ratio in the blended emulsion of hydroxamated polymer to said second polymer is within the range of about 90:10 to 15:85.

25. The composition of claim 17 wherein the second polymer is an ammonium (meth)acrylate homopolymer or a copolymer of said (meth)acrylate with (alk)acrylamide and the molar ratio in the blended emulsion of hydroxamated polymer to said second polymer is within the range of about 85:15 to 58:42.

26. The composition of claim 17 wherein the hydroxamated polymer has a molecular weight ranging from about $1 \times 10^4$ to $6 \times 10^7$, the hydroxamated polymer is derived from a polymer containing pendant ester, amide, anhydride, or nitrile groups, and the hydroxamated polymer has a degree of hydroxamation of about 1 to 90 mole percent.

27. The composition of claim 26 wherein said hydroxamated polymer is derived from a polymer containing amide or ester groups and the degree of hydroxamation of said polymer ranges from about 10 to about 50 mole percent.

18

28. The composition of claim 27 wherein said hydroxamated polymer is derived from an acrylate/acrylamide copolymer.

29. The composition of claim 17 wherein the hydroxamated polymer is a hydroxamated acrylic acid/acrylamide copolymer and the second polymer is a sodium acrylate homopolymer, wherein the molar ratio of hydroxamated copolymer to sodium acrylate homopolymer is in the range of about 90:10 to 15:85.

30. The composition of claim 17 wherein the hydroxamated polymer has a molecular weight ranging from about $1 \times 10^4$ to $6 \times 10^7$.

31. A composition comprising a blend of an inverse emulsion comprising in its discontinuous phase a hydroxamated polymer and a second inverse emulsion comprising in its discontinuous phase a second polymer selected from the group consisting of ammonium (meth)acrylate homopolymers and copolymers of said acrylates with (alk)acrylamides, wherein the molar ratio of hydroxamated polymer to said second polymer is within the range of about 99:1 to 58:42.

32. A composition comprising a blend of an inverse emulsion comprising in its discontinuous phase a hydroxamated polymer and a second inverse emulsion comprising in its discontinuous phase a second polymer selected from the group consisting of sodium (meth)acrylate homopolymers and copolymers of said acrylates with (alk)acrylamides, wherein the molar ratio of hydroxamated polymer to said second polymer is within the range of about 99:1 to 15:85.

33. The composition of claim 31 wherein both of the inverse emulsions that are blended to form said composition are microemulsions.

* * * * *